United States Patent [19]

Shimizu

[11] Patent Number: 4,688,655

[45] Date of Patent: Aug. 25, 1987

[54] ELECTRIC POWER STEERING SYSTEM FOR VEHICLES

[75] Inventor: Yasuo Shimizu, Tochigi, Japan

[73] Assignee: Honda Giken Kogyo Kabushiki Kaisha, Tokyo, Japan

[21] Appl. No.: 891,033

[22] Filed: Jul. 31, 1986

[30] Foreign Application Priority Data

Aug. 9, 1985 [JP] Japan .............................. 60-175073

[51] Int. Cl.$^4$ ............................................. B62D 5/04
[52] U.S. Cl. .................................................. 180/79.1
[58] Field of Search ...................... 180/79.1, 141, 142, 180/143; 318/491, 448, 454

[56] References Cited

U.S. PATENT DOCUMENTS

| | | | |
|---|---|---|---|
| 3,944,014 | 3/1976 | Maisch et al. ...................... | 180/79.1 |
| 4,527,653 | 7/1985 | Agarwal et al. ................... | 180/79.1 |
| 4,561,515 | 12/1985 | Hashimoto et al. ............... | 180/79.1 |
| 4,573,545 | 3/1986 | Kalns .................................. | 180/79.1 |
| 4,580,649 | 4/1986 | Ohe et al. ........................... | 180/79.1 |

FOREIGN PATENT DOCUMENTS

| | | | |
|---|---|---|---|
| 3535503 | 5/1986 | Fed. Rep. of Germany ...... | 180/142 |
| 58-105876 | 6/1983 | Japan ................................... | 180/142 |
| 60-18452 | 1/1985 | Japan ................................... | 180/79.1 |
| 2132950 | 7/1984 | United Kingdom . | |
| 2167025 | 5/1986 | United Kingdom ............... | 180/79.1 |

Primary Examiner—John J. Love
Assistant Examiner—Charles R. Watts
Attorney, Agent, or Firm—Armstrong, Nikaido, Marmelstein & Kubovcik

[57] ABSTRACT

An electric power steering system (50) for vehicles has an electromagnetic servo device (1) including a drive control circuit (30, 40) for feeding a motor drive signal (Va) to an electric motor (14) for producing auxiliary torque to be supplied to an output shaft (6) in accordance with a steering torque signal ($S_1$, $S_2$) from a steering torque detection mechanism (32) which detects steering torque (Ts) acting on an input shaft (5) and a steering speed signal ($S_3$, $S_4$) from a steering speed detection mechanism (36) which detects a steering speed (Ns) of a steering wheel. The drive control circuit is adapted to determine, in dependence on the steering speed signal, a component (D(K.Nm)) of the motor drive signal that corresponds to the steering speed and to judge, in accordance with the steering torque signal and the steering speed signal, in which of a positive steering state and a steering wheel returning state the system is put. In the case the steering system is in the positive steering state, the motor drive signal has a magnitude determined as the sum of the steering speed component and a first provisional component (D(Ts)) preset for the positive steering state. In the case the steering system is in the steering wheel returning state, the magnitude of the motor drive signal is determined as the sum of the steering speed component and a second provisional component (D'(Ts)) preset for the steering wheel returning state.

7 Claims, 17 Drawing Figures

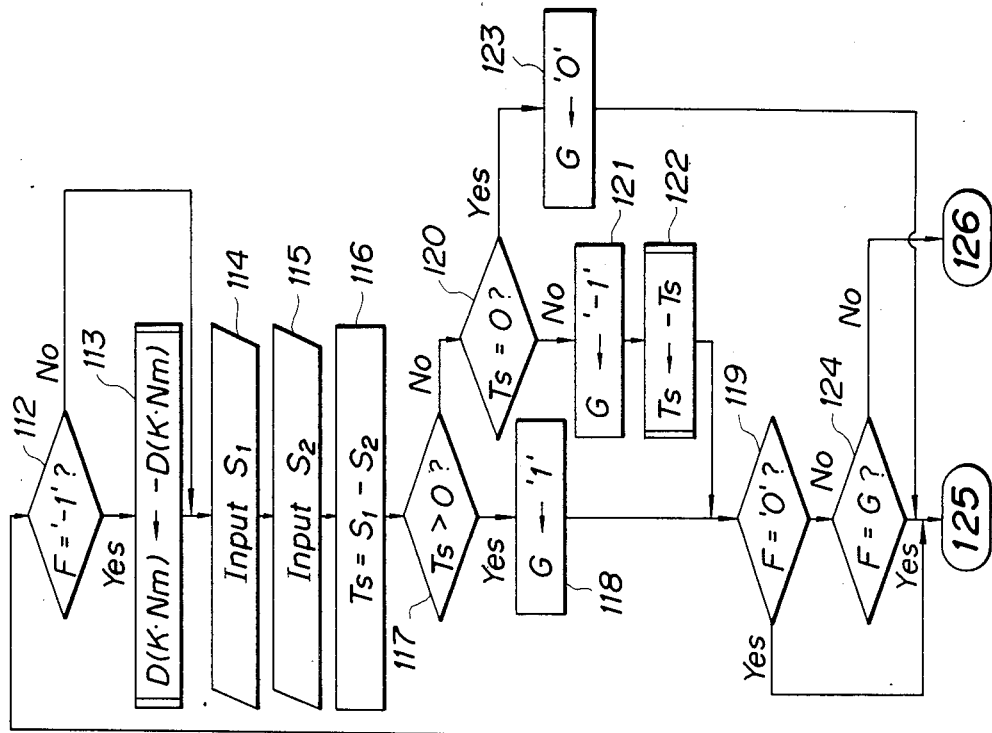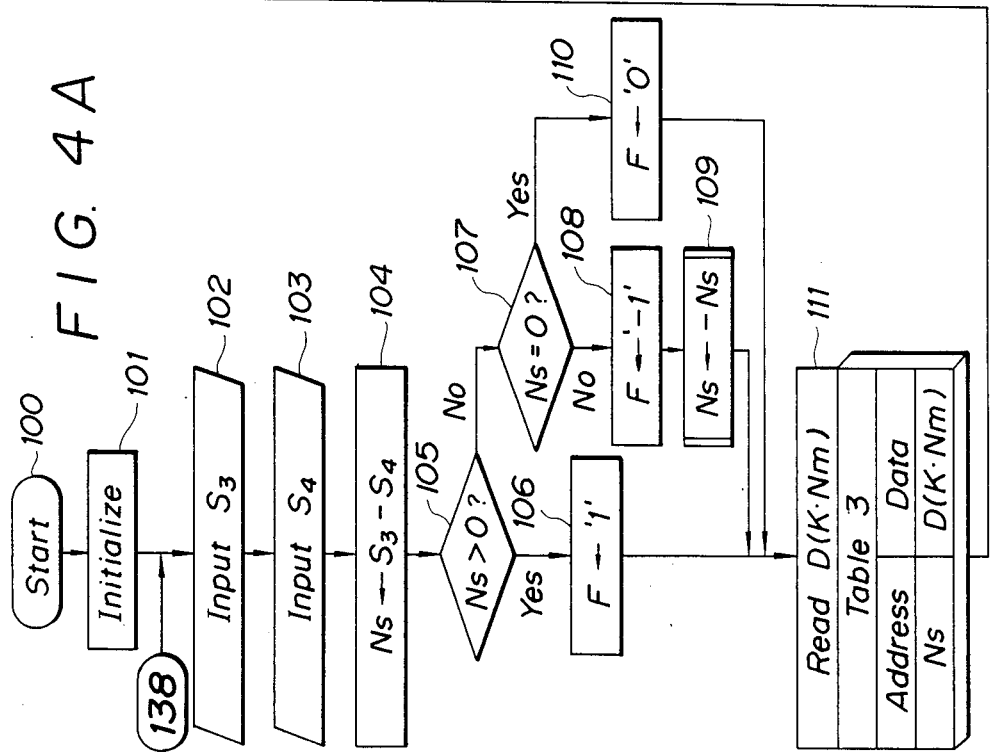
FIG. 4A

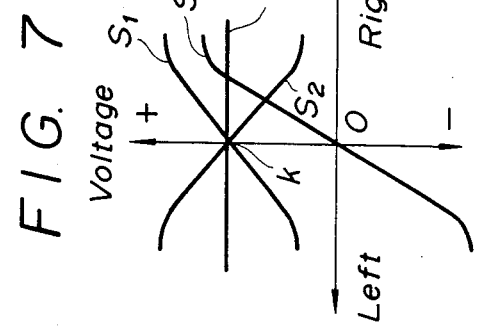
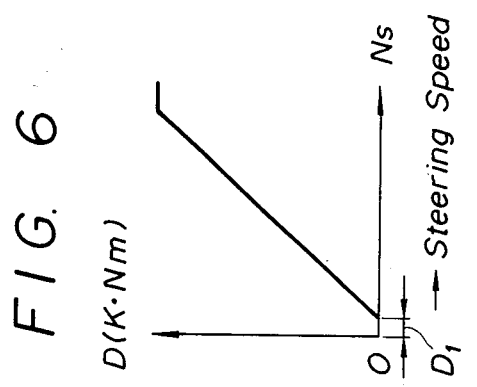
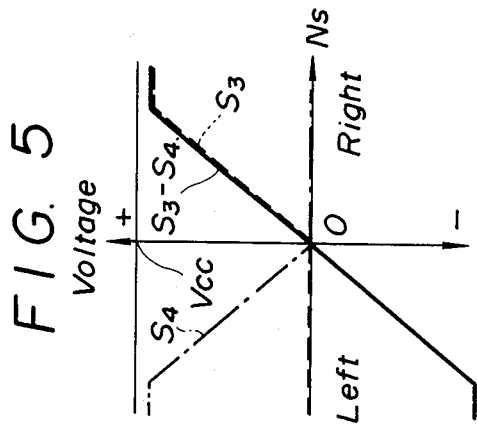
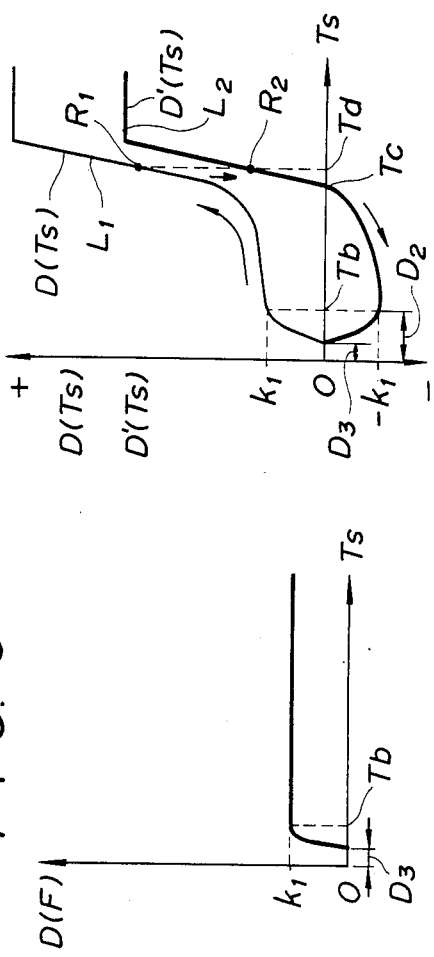
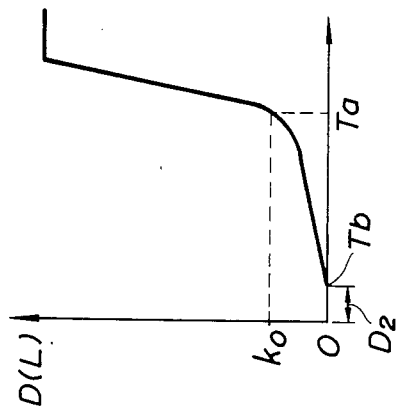

ELECTRIC POWER STEERING SYSTEM FOR VEHICLES

BACKGROUND OF THE INVENTION

1. Field of the Invention

The present invention relates to a power steering system for vehicles, and more particularly, to an electric power steering system for vehicles which produces auxiliary steering torque by means of a steering servo device using an electric motor.

2. Description of Relevant Art

In recent years, in view of problems in hydraulic type power steering systems such as that the structure thereof is complicated, a variety of electric type power steering systems for vehicles have been proposed.

As one of such electric power steering systems for vehicles, there is disclosed an example of an analogue control type in UK Patent Application Publication No. GB 2132950 A, published July 18, 1984.

The electric power steering system for vehicles according to this UK Publication includes an input shaft as a steering shaft connected to a steering wheel, an output shaft interconnected at one end through a universal joint with the input shaft and at the other end through a rack and pinion type gear with a tie rod of steered wheels, an electric motor for supplying auxiliary torque through a reduction gear to the output shaft, a torque detecting mechanism disposed on the input shaft to detect steering torque acting on the input shaft, a motor drive circuit for driving the electric motor, and an analogue type control circuit for feeding the motor drive circuit with a control signal in accordance with a detection signal from the torque detecting mechanism.

The analogue type control circuit is adapted to have an armature voltage PWM-controlled to be impressed to the electric motor, with a polarity determined such that, during a steering operation in either direction of rotation of the steering wheel, the motor is urged to rotate in a direction corresponding to the steering direction. And, a signal corresponding to an armature current is fed back to the control circuit. Like this, the electric motor is adapted to produce controlled torque, which is supplied as the auxiliary torque through the reduction gear to the output shaft, whereby it is contrived to render the steering force light.

Incidentally, not limiting to electric power steering systems, the steering system in general has two different states imaginable with respect to the steering condition thereof, that is, a positive steering state and a negative steering state. The negative steering state can be regarded as a returning state of a steering wheel.

On the other hand, in a vehicle of which the steered wheels are front wheels as in most cases, when it wheels with the steered wheels turned in either direction while traveling, the front wheels have restoring forces acting thereon with tendencies to return the front wheels to their neutral positions. The restoring forces result from the wheel alignment of the front wheels and besides self-aligning torque due to deformations of tyres of the front wheels.

In this respect, if the steering wheel is manipulated with a steering force larger than required to overcome the restoring forces acting on the steered wheels, the steered wheels are caused to turn from the steering wheel side. Such state is the positive steering state. To the contrary, while the restoring forces acting on the steered wheels are so large as to overcome steering forces applied to the steering wheel, the steering wheel is caused to rotate from the steered wheel side. Namely, the steering wheel tends to be returned to its neutral position. Such state is the negative steering state, which corresponds to a returning state of the steering wheel and shall hereinafter be called "steering wheel returning state". The steering wheel returning state appears at such an occasion that, while a vehicle is wheeling in either direction, the driver tries to return the steering wheel to its neutral position, taking the steering wheel or leaving off.

In electric power steering systems with an input shaft of steering operation, in general, in the positive steering state the direction of steering torque acting on the input shaft is coincident with the direction of rotation of the input shaft, and in the steering wheel returning state the former is opposite to the latter.

In the meanwhile, not limiting to the case of the power steering system according to the UK Publication, in various electric power steering systems proposed in recent years, their steering servo devices include friction elements such as an electric motor and a reduction gear. In such servo device, however, an armature voltage to be impressed to the electric motor in accordance with steering torque is determined as a function taking into consideration a load from the road surface side only.

Therefore, in the case of the electric power steering system according to the UK Publication for example, at such a phase of the positive steering state that a manipulation of the steering wheel from the neutral position to left or right is started at a low speed with a relatively small steering force, the armature voltage becomes small. Thus, there appears a steering torque region in which no auxiliary torque that corresponds to such a load on the steering operation as due to the friction elements of the system is produced. In such torque region, it is needed to rotate the friction elements, that is, the electric motor and the like, from the side of the steering wheel. Accordingly, when starting a manipulation of the steering wheel, the steering operation may feel heavier than the case of a manual type steering system, so that the steering feeling may be degraded.

In this concern, it is generally known that between armature voltage Va and armature current Ia of an electric motor, there is such a relation that $Va = Ia \cdot Ra + K \cdot Nm$, where Ra is the internal resistance of the motor, Nm is the speed of rotation of the motor, and K is a constant in terms of induced electromotive force of the motor. Moreover, in the UK Publication above, the rotation speed Nm of the electric motor is proportional to the steering speed of the steering wheel. In this respect, however, even if the armature voltage Va to be impressed to the electric motor were controlled in consideration of an induced voltage Vi ($Vi = K \cdot Nm$) of the motor, such problems as described could have 10 not been overcome. In other words, even if the induced voltage Vi of the electric motor, which Vi is proportional to the steering speed of the steering wheel, were taken into account in addition to the road surface side load to control the armature voltage Va, the above problems could have not been overcome. This is because a duty value attributable to the induced voltage term K·Nm of the armature voltage Va becomes small when the manipulation from the neutral position of the steering wheel is started at a low speed.

Further, in the steering wheel returning state, the returning characteristic of the steering wheel is to receive effects from some of the friction elements, in particular of the electric motor. More particularly, in the state in concern, since the steering wheel is caused to reversely rotate from the steered wheel side, also the electric motor is urged from the same side through the reduction gear to rotate in an opposite direction to the acting direction of steering torque. Incidentally, for the electric motor is adapted to rotate at relatively high speeds to output auxiliary torque through the reduction gear to the steered wheel side, the gear ratio of the reduction gear generally is set considerably larger than 1. In this respect, in that state in which the motor is urged to rotate from the steered wheel side through the reduction gear, such gear ratio functions in the form of a reciprocal number. In other words, the gear ratio of the reduction gear in the steering wheel returning state is reciprocal to that in the positive steering state. As a result, the returning characteristic of the steering wheel receives a corresponding effect, so that the steering feeling may be degraded.

With such points in mind, the present invention has been achieved to effectively solve such problems in conventional electric power steering systems as described.

SUMMARY OF THE INVENTION

An object of the present invention is to provide an electric power steering system for vehicles which permits in the positive steering state thereof a steering wheel to be operated without frictional feeling even in the case a manipulation of the steering wheel from its neutral position to the left or right is started at a low speed with a relatively small steering force and, besides, in the steering wheel returning state thereof a favorable returning characteristic of the steering wheel to be achieved without frictional feeling, so that it is allowed to achieve a smooth and favorable steering feeling comparable with the case of a manual steering system.

To achieve such object, the present invention provides an electric power steering system for vehicles having an electromagnetic servo device including an input shaft operatively connected to a steering wheel, an output shaft operatively connected to a steered wheel, an electric motor for operatively supplying auxiliary torque to the output shaft, a steering torque detecting means for detecting steering torque acting on the input shaft, a steering speed detecting means for detecting a steering speed of the steering wheel, and a drive control means which receives an output signal from the steering torque detecting means and an output signal from the steering speed detecting means and feeds the electric motor with a motor drive signal in accordance with the output signals, wherein the drive control means comprises a first determining means for determining a first provisional component of the motor drive signal in dependence on the output signal from the steering torque detecting means, the first provisional component being preset for the positive steering state of the steering system, a second determining means for determining a second provisional component of the motor drive signal in dependence on the output signal from the steering torque detecting means, the second provisional component being preset for the steering wheel returning state of the steering system, a third determining means for determining a component of the motor drive signal that corresponds to the steering speed of the steering wheel, depending on the output signal from the steering speed detecting means, a steering wheel returning state detecting means for judging in which of the positive steering state and the steering wheel returning state the steering system is put, said steering wheel returning state detecting means selecting from between the first provisional component and the second provisional component that one which corresponds to the result of the judgment, and a means for adding thus selected one of the provisional components to the steering speed component to thereby determine the magnitude of the motor drive signal and outputting the motor drive signal to the electric motor.

The above and further features, objects, and advantages of the present invention will more fully appear from the following detailed description of the preferred embodiment of the invention when the same is read in conjunction with the accompanying drawings.

BRIEF DESCRIPTION OF THE DRAWINGS

FIGS. 4A and 4B are schematic flowcharts of control processes to be executed by a microcomputer unit in the control circuit of FIG. 3.

FIG. 5 is a graph showing characteristics of a steering speed detection signal.

FIG. 6 is a graph showing a duty value attributable to a steering speed.

FIG. 7 is a graph showing characteristics of a steering torque detection signal.

FIG. 8 is a graph showing a duty value attributable to a load from the road surface side.

FIG. 9 is a graph showing a duty value attributable to a frictional load of the electromagnetic servo device.

FIG. 10 is a graph showing a relation between steering torque and a provisional control signal of an electric motor.

DETAILED DESCRIPTION OF THE PREFERRED EMBODIMENT

Figure 1:
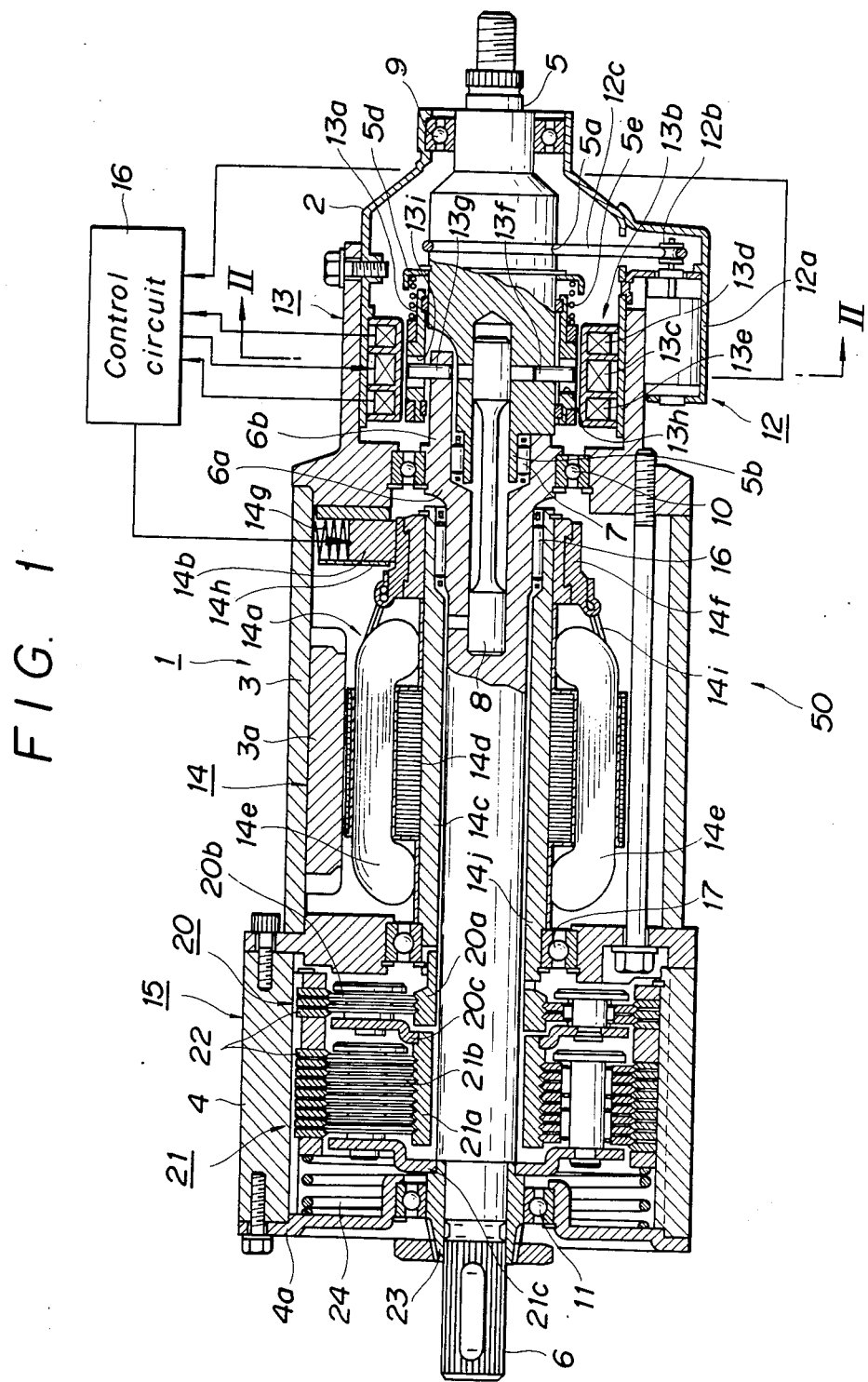
FIG. 1 is a longitudinal sectional view of an electromagnetic servo device as an essential part of an electric power steering system for vehicles according to a preferred embodiment of the present invention, the section being bent at 90° about the longitudinal axis of the electromagnetic servo device.

Referring to FIG. 1, designated at reference numeral 1 is an electromagnetic servo device as an essential part of an electric power steering system 50 for vehicles according to a preferred embodiment of the present invention. In FIG. 1, the electromagnetic servo device 1 is shown by a longitudinal quarter-cutaway section thereof as developed at 90° about the longitudinal axis. Designated at reference numeral 2 is a steering column, 3 is a stator, and 5 and 6 are input and output shafts disposed coaxial with each other.

The input shaft 5 of the electromagnetic servo device 1 is connected at the outer end thereof to a steering wheel (not shown), and the output shaft 6 at the outer end thereof through a rack and pinion mechanism (not shown) to steered wheels (not shown). Through such arrangement, the steered wheels are caused to turn, following a rotating steering operation of the steering wheel.

A diameter-reduced inner end part 5a of the input shaft 5 is engaged to be fitted in a diameter-enlarged inner end part 6a of the output shaft 6 and rotatably supported through a bearing 7 therebetween. The input and output shafts 5, 6 are interconnected with each other by means of a torsion bar 8 arranged coaxial with both of them. Moreover, the input shaft 5 is rotatably supported by a bearing 9 to the steering column 2, and also the output shaft 6 is rotatably supported by a pair of bearings 10, 11 at the side of the steering column 2 and at the side of the stator 3, respectively.

The electromagnetic servo device 1 further comprises a steering rotation speed sensor 12 arranged around the input shaft 5, a steering torque sensor 13 arranged around the mutual engagement portion of the input and output shafts 5, 6, an electric motor 14 as a direct-current machine and a reduction gear 15 both arranged around the output shaft 6, and a control circuit 16 for driving to control the motor 14 in accordance with respective detection signals from the steering speed and steering torque sensors 12, 13.

The steering speed sensor 12 comprises a direct-current generator 12a fixed to the outer circumference of the steering column 2. The axis of rotation of the generator 12a is arranged parallel to that of the input shaft 5, and at one axial end of the generator 12a there is installed a small-diameter pulley 12b. On the other hand, at an axial position corresponding to the pulley 12b, a large-diameter portion of the input shaft 5 has a belt groove 5a formed therein along the outer circumference thereof. Over the belt groove 5a and the pulley 12b there is stretched a belt 12c. Thus, as the input shaft 5 rotates with rotation of the steering shaft, the generator 12a is caused to rotate about the axis thereof. The generator 12a is adapted to then output a pair of signals (to be processed to output as later-described steering speed signals) in correspondence to the direction and speed of rotation of the input shaft 5 and, hence, of the steering wheel.

The steering torque sensor 13 is constituted as a differential transformer consisting of a tubular mobile core 13a axially slidably fitted on the outer circumference of the mutual engagement portion of the input and output shafts 5, 6 and a coil portion 13b fixed to the inner circumference of the steering column 2.

Figure 2:
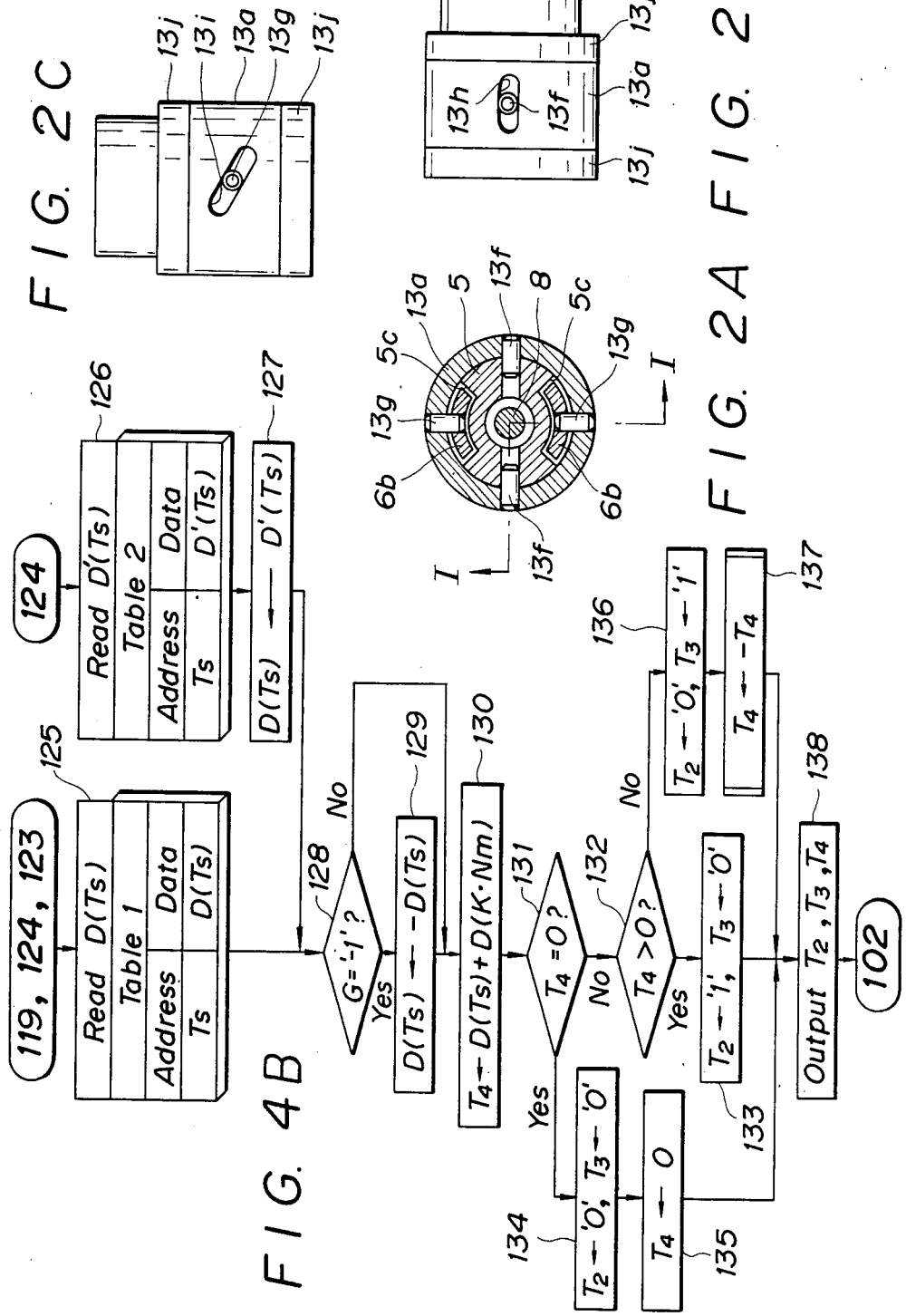
FIG. 2A is a cross-sectional view showing a mobile core of a steering torque sensor in the electromagnetic servo device, along line II—II of FIG. 1.
FIGS. 2B and 2C are side and plan views of the mobile core of FIG. 2A, respectively.

As shown in FIG. 2A, the input shaft 5 has formed in the outer circumference thereof a pair of axially extending slots 5c circumferentially spaced apart at 180° from each other and, on the other hand, the output shaft 6 has a pair of projections 6b axially projected from the inner end part 6a at positions corresponding to the slots 5c, which projections 6b are inserted into the slots 5c, with predetermined gaps provided therebetween, respectively.

Further, as shown in FIGS. 2A to 2C, the mobile core 13a has elongate holes 13i and 13h formed therethrough, in which a pair of pins 13g radially outwardly projected from the projections 6b of the output shaft 6 respectively and another pair of pins 13f radially outwardly projected from the input shaft 5 at circumferentially 90° displaced positions with respect to the pins 13g respectively are engaged, respectively. The elongate holes 13i are inclined at a necessary angle relative to the axial direction, while the elongate holes 13h are formed in parallel with the axial direction. Therefore, with steering torque acting on the input shaft 5, when such a state is brought into existence that, although the steering torque is transmitted through the torsion bar 8 also to the output shaft 6, because the load at the the shaft 6 side is larger than this torque the input and output shafts 5, 6 have a circumferential relative angular difference developed therebetween, thus accompanying a distortion of the torsion bar 8, it then so follows that the core 13a is moved in the axial direction. In other words, the core 13a is axially displaced in correspondence to steering torque acting on the input shaft 5. The mobile core 13a is made of a magnetic material at the middle part thereof and has integrally formed non-magnetic current-conductive parts 13j, 13j at both ends thereof. Moreover, as shown in FIG. 1, between the right end of the mobile core 13a and a stop flange 5d fixed on the input shaft 5 there is interposed a compressed spring 5e made of a non-magnetic material, whereby the core 13a is normally urged in the leftward direction to thereby prevent such lost motion that otherwise might be caused by those clearances between the pins 13f, 13g and the elongate holes 17h, 17i which are due to errors in manufacture.

The coil portion 13b is disposed around the mobile core 13a and comprises a primary coil 13c to which a pulse-like alternating-current signal is input and a pair of secondary coils 13d, 13e which are disposed at both sides of the primary coil 13c and adapted to output a pair of signals corresponding to the axial displacement of the core 13a.

At the steering torque sensor 13 with such constitution as described, therefore, when a circumferential relative angular difference is developed between the input and output shafts 5, 6 following a steering operation of the steering wheel, it is converted first into an axial displacement of the mobile core 13a and then therefrom into the respective signals to be electrically output from the secondary coils 13d, 13e.

Figure 3:
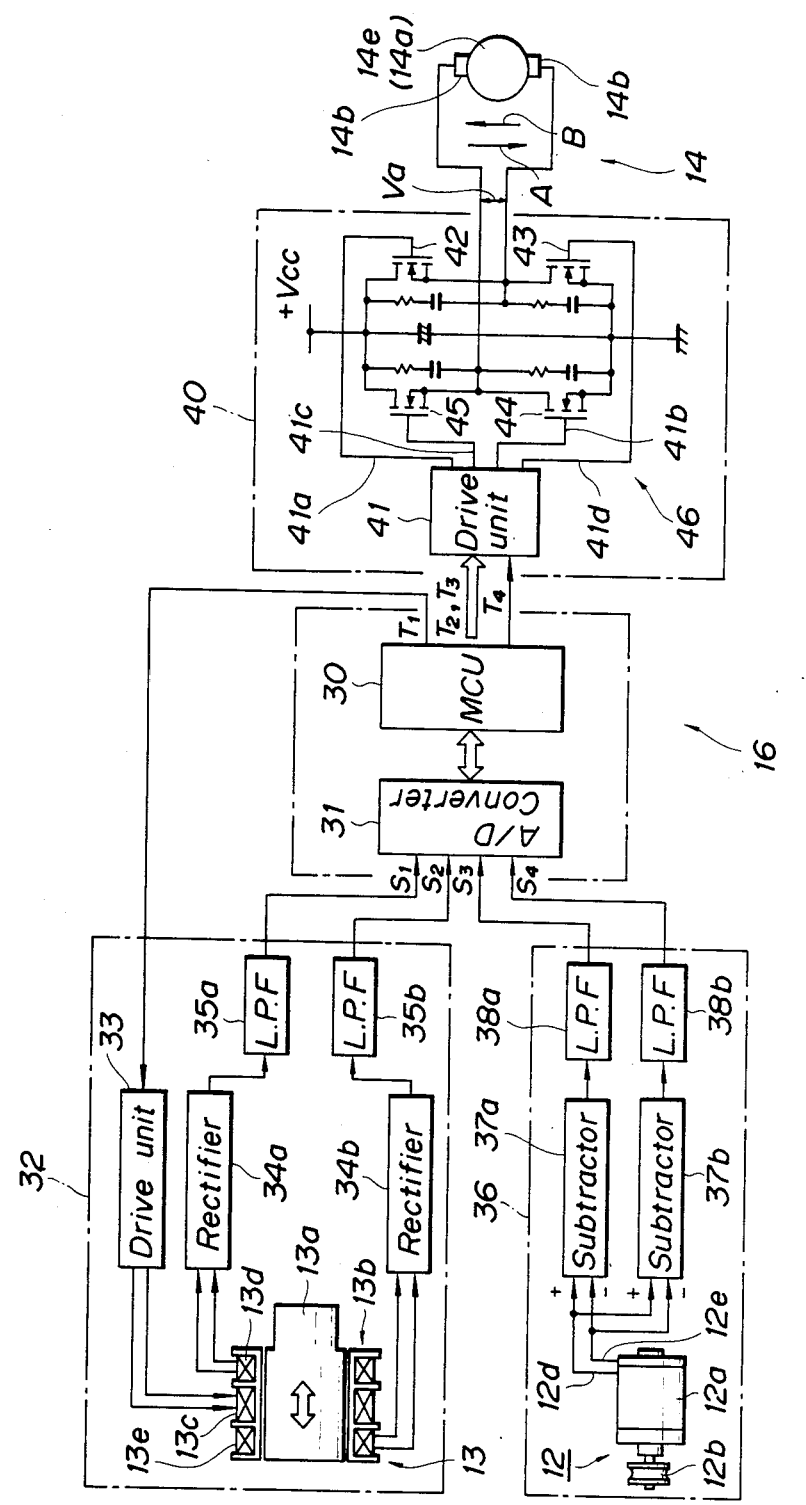
FIG. 3 is a diagram showing in detail a control circuit of the electromagnetic servo device.

More particularly, in the case where, exemplarily under such a condition that steering torque with a tendency to produce clockwise rotation when viewed at the side of the steering wheel is applied to the input shaft 5 while a larger load than the steering torque is imposed on the output shaft 6, the input shaft 5 is thus rotated relative to the output shaft 5 in the clockwise direction when viewed at the steering wheel side, then the mobile core 13a is caused to move rightwardly in FIG. 1 and FIG. 2B as well as in FIG. 3 that will be described later, that is, upwardly in FIG. 2C.

To the contrary, in the case where the input shaft 5 is rotated relative to the output shaft 6 in the counterclockwise direction when viewed at the steering wheel side, then the mobile core 13a is caused to move in the opposite direction to the above.

In each of the foregoing cases, the mobile core 13a is displaced in either axial direction thereof at a distance from an original middle position thereof in proportion to the circumferential relative angular difference between the input and output shafts 5, 6, because the inclined elongate holes 13i of the core 13a, which are engaged with the pins 13g provided at the side of the output shaft 6, are so shaped as to have a straight-linear form when the core 13a of a tubular form is developed.

In this respect, the mobile core 13a is arranged so as to rest on the original middle position under the condition that, without steering torque acting on the input shaft 5, no circumferential relative angular difference is developed between the input and output shafts 5, 6. In the state shown in FIGS. 1 and 2A to 2C, the mobile core 13a is located at such middle position.

Incidentally, due to an engagement relation between the projections 6b of the output shaft 6 and the slots 5c of the input shaft 5, the circumferential relative angular difference between the shafts 5, 6 is controlled so as not to exceed a predetermined value. Namely, when the relative angular difference between the shafts 5, 6 is increased, along with a steering operation causing the input shaft 5 to rotate, to the predetermined value in concern, then one side face of each of the projections 6b is brought into abutment with one side face of corresponding one of the slots 5c so that, thereafter, the output shaft 6 is caused to integrally rotate with the input shaft 5. Such engagement relation between the projections 6b and the slots 5c plays a roll of a fail-safe mechanism of the electromagnetic servo device 1. In this respect, it will be understood that, under the condition that the driving of the electric motor 14 is stopped as will be described later, by functions of the fail-safe mechanism and the torsion bar 8 the electric power steering system 50 is adapted for manual steering operations to be performed without assist power.

The electric motor 14 comprises the stator 3 which is integrally joined to the steering column 2, at least one pair of magnets 3a secured to the inner circumference of the stator 3, a rotor 14a rotatably arranged around the output shaft 6, and a pair of brushes 14b adapted, in brush holders 14h fixed to the stator 3, to be radially inwardly pushed with springs 14g. The rotor 14a includes a tubular shaft 14c rotatably supported with respect to the output shaft 6 and the stator 3, by roller and ball bearings 16, 17, respectively. The tubular shaft 14c is arranged coaxial with the output shaft 6, and has integrally fixed on the outer circumference thereof a laminated ferrous core 14d formed with skew slots and multiple windings 14e laid thereon. A predetermined fine air gap is left between the inner circumferences of the magnets 3a and the outer circumferences of the windings 14e. Moreover, the shaft 14c has fixed thereon a commutator 14f circumferentially equiangularly divided into a plurality of segments to be connected to terminals 14i of the windings 14e, respectively. Against the commutator 14f, the brushes 14b are elastically pushed to be kept in contact therewith.

The reduction gear 15 comprises a pair of planetary gears 20, 21 arranged around the output shaft 6.

The planetary gear 20 as a primary stage of the gear 15 includes a sun roller 20a engaged with an output end part 14j of the tubular shaft 14c so as to be axially slidable but circumferentially non-rotatable relative thereto, the sun roller 20a being formed along the outer circumference thereof with a plurality of annular grooves of a V form in section axially spaced apart from each other. The planetary gear 20 further comprises a common ring roller 22 axially slidably spline-fitted to the inner circumference of a casing 4, the ring roller 22 being composed of a plurality of neighboring annular segments shaped along the inner circumferences thereof so as to define therebetween annular grooves of a substantially V form in section, three planet rollers 20b interposed between the sun roller 20a and the ring roller 22, the planet rollers 20b each respectively consisting of a plurality of axially slidable disc-like elements shaped along the outer circumferences thereof into an inverted-V form in section, and a first carrier member 20c for rotatably supporting the respective planet rollers 20b.

The planetary gear 21 as a secondary stage of the gear 15 includes a sun roller 21a loose-fitted on the output shaft 6 and integrally joined with the first carrier member 20c, the sun roller 21a being formed along the outer circumference thereof with a plurality of annular grooves of a V form in section axially spaced apart from each other. The planetary gear 21 further comprises the common ring roller 22, three planet rollers 21b interposed between the sun roller 21a and the ring roller 22, the planet rollers 21b each respectively consisting of a plurality of axially slidable disc-like elements shaped along the outer circumferences thereof into an inverted-V form in section, and a second carrier member 21c for rotatably supporting the respective planet rollers 21b. The second carrier member 21c is mounted on an annular member 23 connected to the output shaft 6 in a splined manner, the member 23 being rotatably supported by use of the bearing 11 to a cover member 4a of the casing 4. The sun rollers 20a, 21a, common ring roller 22, and planet rollers 20b, 21b are made of a metallic material.

Between the inside of the cover member 4a and the common ring roller 22 there is installed a compressed spring 24, whereby the annular segments of the ring roller 22 are urged in the axial direction. Like this, substantially uniform surface pressures are exerted to frictionally engaged contact areas between the respective rollers 20a, 20b, 21a, 21b, 22, thereby permitting the reduction gear 15 to effect necessary transmission of torque. As will be understood, the rotation of the electric motor 14 is transmitted to the output shaft 6 through the reduction gear 15, where it is reduced in speed.

Next, with reference to FIG. 3, description will be made of the control circuit 16.

In FIG. 3, designated at reference numeral 30 is a microcomputer unit (hereinbelow called "MCU 30"). To the MCU 30, there are input through an A/D converter 31 respective detection signals $S_1$ to $S_4$ from a steering torque detection circuit 32 and a steering rotation speed detection circuit 36, in accordance with commands from the MCU 30.

The steering torque detection circuit 32 comprises the aforementioned steering torque sensor 13, a drive unit 33 through which a clock pulse $T_1$ generated in the MCU 30 is divided at a number of stages and amplified to be output in the form of an alternating-current signal of a rectangular or sinusoidal wave to the primary coil 13c of the sensor 13, a pair of rectifiers 34a, 34b for rectifying the respective electric signals output from the secondary coils 13d, 13e of the torque sensor 13 in accordance with the axial displacement of the mobile core 13a, and a pair of low-pass filters 35a, 35b for eliminating high-frequency components from respective output signals of the rectifiers 34a, 34b to thereby convert these signals into stable direct-current voltage signals to be output as steering torque detection signals $S_1$, $S_2$.

The steering speed detection circuit 36 comprises the direct-current generator 12a of the steering speed sensor 12, the generator 12a having a pair of terminals 12d, 12e for outputting the aforementioned signals therefrom, a pair of subtractors 37a, 37b for subtracting respective values of these output signals from each other, and a pair of low-pass filters 38a, 38b for eliminating high-frequency components from respective output signals of the subtractors 37a, 37b to obtain a pair of signals to be output as steering speed detection signals $S_3$, $S_4$.

The MCU 30 comprises such unshown necessary parts as the I/O port, a memory, an arithmetic logical unit, a controller, and a clock generator to which a clock pulse of a crystal oscillator is input.

The MCU 30 as well as the circuits 32, 36 and a later-described motor drive circuit 40 is supplied with electric power from a battery (not shown) through an ignition switch (not shown). Thus, while the ignition switch is turned on, the MCU 30 is put in an energized state thereof, where it is permitted to process the respective input signals $S_1$ to $S_4$ from the detection circuits 32, 36, following a program stored in the memory, to output control signals $T_2$, $T_3$, and $T_4$ to be used for driving the electric motor 14 to the motor drive circuit 40, to thereby control the driving of the motor 14. In those control signals, $T_2$ and $T_3$ are direction of rotation representative signals responsible for determining the terminal polarity of an armature voltage Va to be impressed to the electric motor 14 in correspondence to the steering direction, and $T_4$ is a signal responsible for determination of magnitude of the armature voltage Va.

The motor drive circuit 40 comprises a drive unit 41, and a bridge circuit 46 consisting of four FET's (field effect transistors) 42, 43, 44, 45. Of the four FET's, two 42, 45 that constitute two neighboring sides of the bridge have respective drain terminals thereof connected to the positive side of the battery and source terminals thereof connected to drain terminals of the remaining two 43, 44, respectively. Respective source terminals of these FET's 43, 44 are both connected to the earth as the common side and thus to a negative terminal of the battery. The four FET's 42, 43, 44, 45 have gate terminals thereof connected to output terminals 41a, 41d, 41b, 41c of the drive unit 41, respectively. The respective source terminals of the FET's 42, 45 are connected as output terminals of the bridge circuit 40 through the brushes 14b to the armature windings 14e of the electric motor 14.

The drive unit 41 is adapted to output a signal from the terminal 41a or 41c for exclusively driving to turn on the FET 42 or 45 in accordance with the signals $T_2$, $T_3$ sent as motor rotation direction control signals from the MCU 30 and, concurrently, to output a signal from the terminal 41b or 41d for exclusively bringing the FET 44 or 43 into a drivable state thereof, to thereby control the driving of the electric motor 14. In the case of the signal from the terminal 41b or 41d, a frequency-constant rectangular pulse signal of a battery level is modulated in pulse duration, to be exclusively output to the gate of the FET 44 or 43, in accordance with the signal $T_4$ as a motor voltage control signal.

In the motor drive circuit 40, therefore, in accordance with the control signals $T_2$, $T_3$, $T_4$, one 42 of the two FET's 42, 45 and the FET 44 cooperating therewith are driven to be turned on and to be controlled in a PWM manner, respectively, or likewise the other FET 45 and the FET 43 cooperating therewith are on-driven or PWM-driven, respectively, to thereby control the direction of rotation and output power (number of revolutions and torque) of the electric motor 14.

In this respect, for example, in the case the FET's 42 and 44 are driven as described above, the armature voltage Va has a magnitude proportional to the pulse duration of the pulse signal output from the terminal 41b of the drive unit 41 and such a polarity that conducts an armature current Ia in a direction B causing the electric motor 14 to rotate clockwise. To the contrary, in the case the FET's 45 and 43 are driven, the magnitude of the armature voltage Va is proportional to the pulse duration of the pulse signal from the terminal 41d of the unit 41 and the polarity thereof is so determined as to conduct the armature current Ia in a direction A causing the motor 14 to rotate counterclockwise.

There will be described below various programmed functions of the MCU 30.

FIGS. 4A and 4B are flowcharts showing the outline of control processes to be executed at the MCU 30. In those Figures, designated at reference numerals 100 to 138 are associated process stages.

By turning on the ignition switch, the MCU 30 as well as other associated circuits is applied with electric power and permitted to exhibit control functions thereof.

First, at stage 101, respective registers and data of a RAM as well as necessary circuits in the MCU 30 are initialized.

Next, at stages 102 and 103, the detection signals $S_3$, $S_4$ from the steering speed detection circuit 36 are read in turn. Though not shown, subsequently to the stage 103, there is made a diagnosis whether thus read signal values are normal or not. If an abnormality is found, then the feed of the control signals $T_2$, $T_3$, $T_4$ from the MCU 30 to the motor drive circuit 40 is interrupted, so that the driving of the electric motor 14 stops, allowing manual steering operations to be performed without assist power.

In this respect, if the detection circuit 36 is normal, the detection signals $S_3$, $S_4$ therefrom have such relations to algebraically represented steering speed Ns as shown in FIG. 5. Thus, in the case respective direct-current voltage levels of the detection signals $S_3$, $S_4$ concurrently take positive values and in the case either the detection signal $S_3$ or $S_4$ is substantially equal to a battery level Vcc, the steering speed detection circuit 36 is judged to be abnormal. In this concern, the generator 12a of the circuit 36 has such a characteristic that renders the expectable highest level of the signals $S_3$, $S_4$ lower than Vcc by a predetermined appreciable voltage difference.

In the case the detection signals $S_3$, $S_4$ as read at the stages 102, 103 are judged normal, the flow goes to stage 104, where such a calculation is made that $S_3-S_4$, letting the result be a value of the steering speed Ns. In practical cases, however, to obtain one of continuous integers as the value of Ns, the result of $S_3-S_4$ may be multiplied by a predetermined numeral and then substituted for Ns. Like comment is applicable also to stage 116 that will be described later.

Next, at decision stage 105, to discriminate the direction of the steering speed, there is made a judgment whether or not the value of Ns is positive. And, if the steering speed is of clockwise rotation, that is, if Ns is positive, the flow goes to stage 106, where a first flag F is set such that F='1'. Unless the steering speed is of clockwise rotation, the flow goes to decision stage 107 for making a judgment as to whether Ns is zero or not. If the steering speed is of counterclockwise rotation, that is, if Ns is not zero, the flow goes through stage 108, where the first flag F is set such that F='−1', to stage 109, where a convertion process is executed to make the steering speed Ns an absolute value such that Ns=−Ns. Thereafter, the flow goes to stage 111. If the Ns is so judged at the stage 107 that Ns=0, then the flow goes to the stage 111 through stage 110, where the first flag F is set such that F='0'.

At the stage 111, in dependence on the absolute value of the steering speed Ns, a content of a table 3 in a ROM (unshown) is directly read in an address designation manner. In the table 3, which is stored in advance in the ROM, there are listed those duty values D(K·Nm) which correspond to various induction voltages K·Nm of the electric motor 14 that have such a relation to the absolute value of the steering speed Ns as shown by FIG. 6. In FIG. 6, $D_1$ represents a dead zone. K is a constant in terms of induced electromotive force of the electric motor 14, and Nm the speed of rotation of the motor 14. Accordingly, at the stage 111, such a content of memory that has an address represented by the absolute value of the steering speed Ns, that is, a duty value D(K·Nm) of K·Nm is read. In this respect, it will be understood that, since the rotation of the electric motor 14 is transmitted to the output shaft 6 through the reduction gear 15 of which the reduction ratio is substantially constant, the induction voltage K·Nm of the motor 14 depends on the steering speed Ns. Incidentally, the duty value D(N·Nm) is prepared so as to appear as that component of the armature voltage Va which corresponds to the steering speed.

Thereafter, the flow goes to decision stage 112.

At the stage 112, to provide the duty value D(K·Nm) of the steering speed attributed component with a sign corresponding to the direction of the steering speed, there is made a judgment about the content of the first flag F as it is then given. If F='−1', the direction of the steering speed is counterclockwise and the flow goes to stage 113, where the duty value D(K·Nm) is stored as a negative value, and thereafter to stage 114. Unless F='−1', the direction of the steering speed is clockwise or that of a zero speed, and the flow directly goes to the stage 114. Incidentally, it will be comprehensible that the content of the first flag F corresponds to an algebraic representation of the direction of the steering speed.

Next, at the stage 114 and stage 115, the steering torque detection signals $S_1$, $S_2$ are read in turn. Though not shown, subsequently to the stage 115, there is made a diagnosis whether respective values of the read signals $S_1$, $S_2$ are normal or not. If an abnormality is found, then the feed of the control signals $T_2$, $T_3$, $T_4$ from the MCU 30 to the motor drive circuit 40 is interrupted, so that the driving of the electric motor 14 stops, allowing manual steering operations to be performed without assist power.

In this respect, since the steering torque sensor 13 is constituted in the form of a differential transformer, if the detection circuit 32 is normal the detection signals $S_1$, $S_2$ have such relations to algebraically represented steering torque Ts as shown in FIG. 7, so that half of the sum of the signals $S_1$, $S_2$ becomes a substantially constant value k. Thus, though not shown, after the stage 115, there is made a judgment whether or not the difference between $(S_1+S_2)/2$ and k is found within a predetermined range and, if the difference is not within this range, the steering torque detection circuit 32 is concluded to be out of order. In the case the steering torque detection signals $S_1$, $S_2$ as read are normal, the flow goes to stage 116. In this regard, because, as described in conjunction with FIG. 2A, side faces of the projections 6b of the output shaft 6 are brought into abutment with corresponding side faces of the slots 5c of the input shaft 5, in those ranges of FIG. 7 in which the steering torque Ts is in excess of a predetermined value in either of leftward and rightward directions the detection signals $S_1$, $S_2$ have their values kept constant.

At the stage 116, there is made such calculation that $S_1-S_2$, letting the result be a value of the steering torque Ts.

Then, at decision stage 117, to discriminate the acting direction of the steering torque, there is made a judgment whether or not the value of Ts is positive. And, if the acting direction of the steering torque is clockwise, that is, if the value of Ts is positive, the flow goes through stage 118, where a second flag G is set such that G='1', to decision stage 119. Unless the acting direction of the steering torque is clockwise, the flow goes to decision stage 120 for making a judgment as to whether Ts is zero or not. If the steering torque Ts is not zero at the stage 120, the flow goes through stage 121, where the second flag G is set such that G='−1', to stage 122, where a convertion process is executed to make the steering torque Ts an absolute value such that Ts=−Ts; thereafter, it goes to the stage 119. On the other hand, if the Ts is judged to be zero at the stage 120, then the flow goes to stage 125 through stage 123, where the second flag G is set such that G='0'. It will be comprehensible that the content of the second flag G corresponds to an algebraic representation of the acting direction of the steering torque, that is, the sign of the steering torque Ts.

At the decision stage 119, in order to judge whether or not the steering wheel is put in a rotating state thereof, a judgment is made as to the value of the first flag F as it is then given. If F='0', the flow goes to the stage 125. Unless F='0', the flow goes to decision stage 124.

At the decision stage 124, in order to judge whether or not the rotating direction of the steering wheel and the acting direction of the steering torque is coincident with each other, there is made a judgment whether or not the value of the first flag F and that of the second flag G, as they are then given, are equal to each other. If F=G, then the rotating direction of the steering wheel and the acting direction of the steering wheel are coincident, so that the steering system 50 is judged to be in the positive steering state thereof. In this case, the flow goes to the stage 125.

At the stage 125, in dependence on the absolute value of the steering torque Ts, a content of a table 1 in the ROM is directly read in an address designation manner. In the table 1, which is stored in advance in the ROM, there are listed those data of a first provisional duty value D(Ts) for the armature voltage control signal $T_4$ which have such a relation to various absolute values of the steering torque Ts as represented by a characteristic curve $L_1$ in FIG. 10. The duty value D(Ts) is a provisional value preset for the positive steering state and obtained as the sum of a road surface side load attributable duty value D(L) and a frictional load attributable duty value D(F).

The road surface side load attributable duty value D(L) is a duty value having such a relation to the steering torque Ts as shown by FIG. 8. In FIG. 8, $D_2$ represents a dead zone. As will be seen from this Figure, the duty value D(L) remains zero while Ts increases from zero till it reaches a predetermined value Tb. Moreover, the content of the table 1 is prepared such that D(L) has a value $k_0$ when the steering torque Ts is increased to a predetermined value Ta. Incidentally, the duty value D(L) is equal to a duty value D(Ia·Ra) attributed to the term of Ia·Ra in the expression of the armature voltage Va, where Ia is the armature current of the electric motor 14 and Ra is the sum of resistances such as of the armature windings, brushes, and wiring. In other words, the duty value D(L) is prepared so as to appear as such a component of the armature voltage Va that corresponds to a load from the road surface side.

The frictional load attributable duty value D(F) is a duty value having such a relation to the steering torque Ts as shown by FIG. 9. In FIG. 9, $D_3$ represents a dead zone preset narrower than the dead zone $D_2$. The table 1 is prepared such that, in a region in which Ts is larger than the predetermined value Tb, D(F) has a constant value $k_1$, where $k_1$ is a necessary duty value for the electric motor 14 to produce a torque component corresponding to a load due to friction elements of the servo device 1. In other words, the duty value D(F) is prepared so as to appear as such a component of the armature voltage Va that corresponds to the frictional load.

Incidentally, in practice, at the stage 125, the first provisional duty value D(Ts) is to be read in an address designation manner after an initial address of the table 1 was added as a bias value to the absolute value of the steering torque Ts. Similar comment is applicable also to stage 126 that will be described later.

On the other hand, if the conclusion of the judgment at the stage 124 is such that the first flag F is inequal to the second flag G, the flow goes to stage 126. In such case, the rotating direction of the steering wheel is not coincident with the acting direction of the steering torque so that the steering system 50 is concluded to be in the steering wheel returning state thereof.

At the stage 126, in dependence on the absolute value of the steering torque Ts, a content of a table 2 in the ROM is directly read in an address designation manner. In the table 2, which is stored in advance in the ROM, there are listed those data of a second provisional duty value D'(Ts) for the armature voltage control signal $T_4$ which have such a relation to various absolute values of the steering torque Ts as represented by a characteristic curve $L_2$ in FIG. 10. The duty value D'(Ts) is a provisional value preset for the steering wheel returning state and obtained by subtracting the frictional load attributable duty value D(F) from the road surface side load attributable duty value D(L). After the stage 126, the flow goes to stage 127, where the second provisional duty value D'(Ts) is stored as provisional duty value D(Ts).

Referring now to FIG. 10, the characteristic curve $L_1$ of the positive steering state describes that as the steering torque Ts increases beyond the dead zone $D_3$, approaching the upper limit of the dead zone $D_2$, the first provisional duty value D(Ts) also increases and, just when the dead zone $D_2$ is exceeded, that is, at such occasion that Ts=Tb, it reaches the value $k_1$ or D(Ts)=$k_1$.

On the other hand, by the characteristic curve $L_2$ of the steering wheel returning state, it is described that as the steering torque Ts decreases from a larger value than a predetermined value Tc to the value Tc, the second provisional duty value D'(Ts) also decreases toward zero and, at such occasion that Ts=Tc, it becomes zero or D'(Ts)=0. Moreover, as the steering torque Ts decreases from the value Tc to the value Tb, the provisional duty value D'(Ts) gradually increases in absolute value from zero to $|-k_1|$, while D'(Ts) is negative under such condition. Further, as Ts still decreases from Tb, D'(Ts) decreases in absolute value from $|-k_1|$ to zero, while D'(Ts) itself takes negative values.

The provisional duty value D(Ts) as obtained at the stage 125 or by the combination of the stages 126, 127 includes the frictional load attributable duty value D(F). Thus, the steering operation in the positive steering state of the steering system 50 is kept free from effects of the friction elements. Such advantage is significant while the steering torque Ts is in between the values Ta and Tb.

Returning to FIG. 4B, at decision stage 128, to discriminate the acting direction of the steering torque, there is made a judgment about the value of the second flag G as it is then given. If G='−1', that is, in the case the acting direction of the steering torque is counter-clockwise, then the flow goes to stage 129, where a conversion is executed to make the provisional duty value D(Ts) an absolute value such that D(Ts)=−D(Ts), and thereafter to stage 130. Unless G='−1', that is, if the acting direction of the steering torque is clockwise or if there is no steering torque acting, then the flow directly goes to the stage 130.

At the stage 130, the duty value D(K·Nm) is added to the duty value D(Ts) as obtained in the described manner, and the result is stored as a determined value of the control signal $T_4$ that constitutes the basis of the magnitude of the armature voltage Va to be impressed to the electric motor 14. Strictly speaking, the value of the signal $T_4$ as now given is a duty value for the pulse signal to be fed from the drive unit 41 to the FET 43 or 44.

Next, at decision stage 131, to determine the polarity of the armature voltage Va, there is made a judgment whether thus obtained $T_4$ is zero or not. In the case $T_4$ is zero, then the flow goes throgh stage 134, where respective values of the motor drive direction responsible control signals $T_2$, $T_3$ are determined such that $T_2$='0', $T_3$='0', and stage 135, where the signal $T_4$ is set to zero, to stage 138. To the contrary, if the value of $T_4$ is not zero, the flow goes to decision stage 132.

At the decision stage 132, it is judged whether or not $T_4$ is larger than zero. In the case $T_4$ is larger than zero, the flow goes to the stage 138 through stage 133, where the signals $T_2$, $T_3$ are set such that $T_2$='1' and $T_3$='0'. If $T_4$ is not larger than zero, that is, if $T_4$ is negative, the flow goes to stage 136, where the signals $T_2$, $T_3$ are set such that $T_2$='0' and $T_3$='1', and thereafter to stage 137 to execute a conversion into absolute value of the signal $T_4$. In other words, at the stage 137, $T_4$ is multiplied by a factor of −1 and thereby converted into a positive value. Thereafter, the flow goes to the stage 138.

At the stage 138, there are output the signals $T_2$, $T_3$, and $T_4$. Then, the flow goes to the stage 102.

In the foregoing arrangement, the drive unit 41 of the motor drive circuit 40 is adapted to output the control signals from the terminals 41a to 41d, as necessary for the control of magnitude and polarity of the armature voltage Va, such that, when $T_2$='1' and $T_3$='0', the FET 44 is put in a drivable state and, when $T_2$='0' and $T_3$='1', the FET 45 is turned on and the FET 43 is put in a dribvable state. As described, the signal $T_4$ is responsible for determination of the magnitude of the armature voltage Va to be impressed from the bridge circuit 46 to the electric motor 14. For example, in the case the direction control signals $T_2$, $T_3$ have such values that $T_2$='1' and $T_3$='0', the FET 44 is to be PWM-driven in accordance with the signal $T_4$. To the contrary, in the case they have such values that $T_2$='0' and $T_3$='1', the FET 43 is PWM-driven in accordance with the signal $T_4$. Incidentally, in the case the signals $T_2$, $T_3$, $T_4$ are all zero, the electric motor 14 is not driven.

In the programmed procedure above, at the stages 111, 125, and 126, where the duty value D(K·Nm) attributed to the steering speed Ns, the first provisional duty value D(Ts) for the positive steering state, and the second provisional duty value D'(Ts) for the stering wheel returning state are determined, respectively, the determination of these duty values is directly made in an address designation manner without complicated computation processes. Accordingly, the necessary time for the flow to go around the stages 102 to 138 is substantially constant, whereas such necessary time can be set in advance in relation to the constitution of the MCU 30.

Referring again to FIG. 10, it will be described below how the duty value D(Ts) or D'(Ts) as a provisional component of the armature voltage Va varies while the steering wheel as once manipulated in either direction returns to the neutral position.

A typical case is now supposed, in which the steering torque Ts is once increased from zero to a predetermined value Td and thereafter again decreased therefrom to zero. First, as the steering torque Ts increases from zero to the predetermined value Td, the provisional duty value increases along the characteristic curve $L_1$ to a point $R_1$ in FIG. 10. Continuously therefrom, as the steering torque Ts decreases from Td to zero, the provisional duty value varies along the characteristic curve $L_2$ from a point $R_2$ in FIG. 10.

Figure 11:
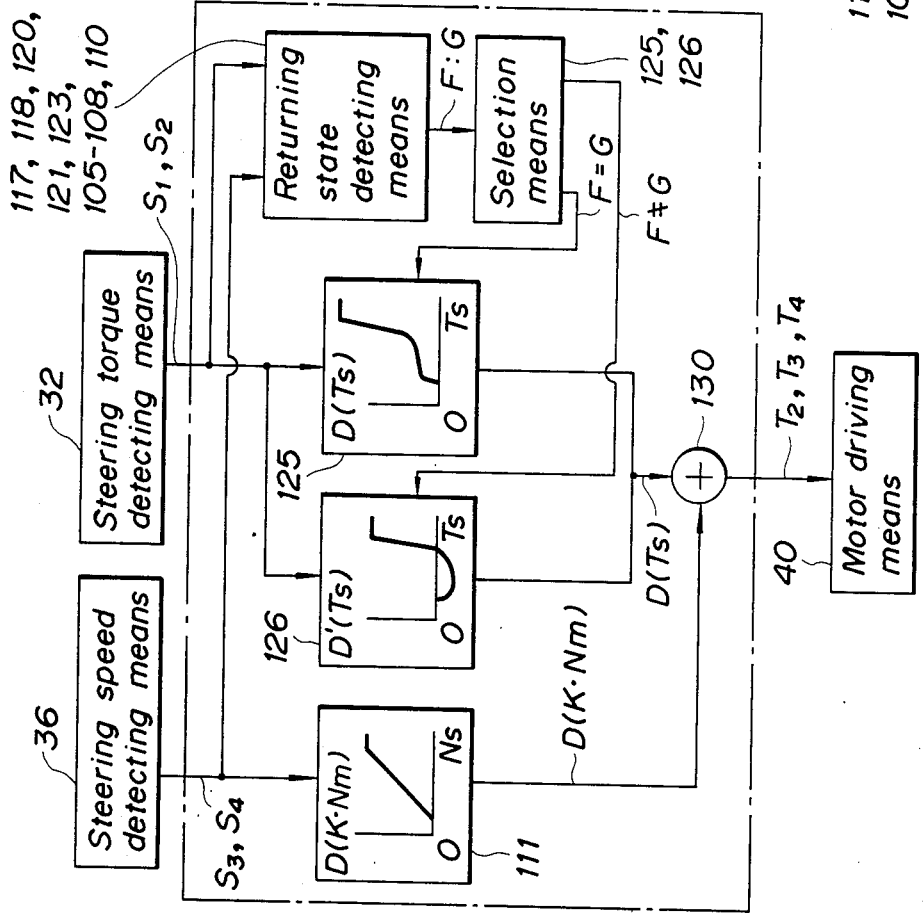

FIG. 11 is a diagram in which various functions of the control circuit 16 are schematically represented by use of blocks, while showing interrelations between such essential elements of the circuit 16 that are shown in FIG. 3 and associated process stages in the process flow of FIGS. 4A and 4B.

Figure 12:
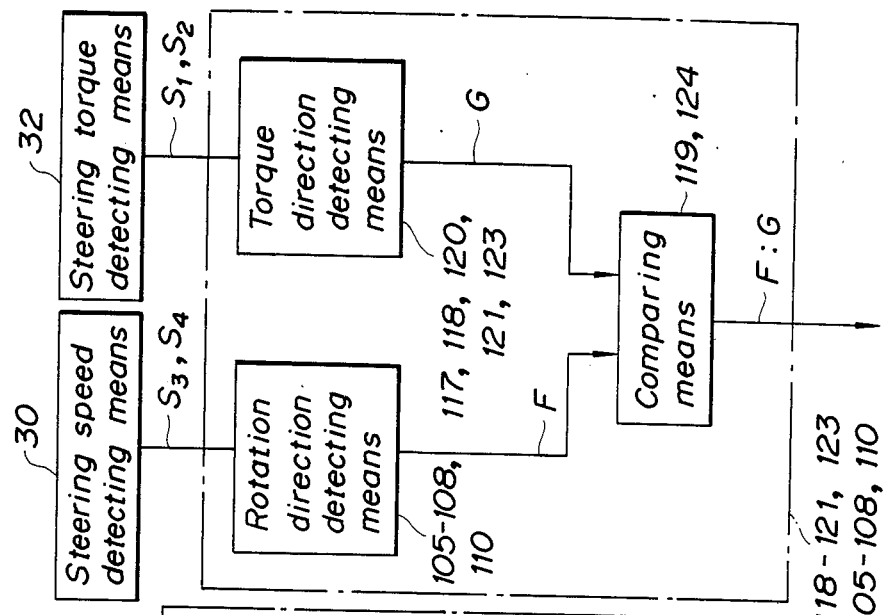
FIGS. 11 and 12 are schematic functional block diagrams of the control circuit of FIG. 3.

Further, in FIG. 12, there is shown a block diagram describing into details a returning state detecting means of FIG. 11.

According to such control processes as the stages 100 to 138, in the positive steering state of the system 50, the armature voltage Va to be impressed to the electric motor 14 is determined in dependence on the control signal $T_4$ which depends on the characteristic curve $L_1$ obtained by adding the duty value D(F) that corresponds to a load due to friction elements of the servo device 1 to the road surface side load attributed duty value D(L). Thus, in cases where the steering speed Ns is small and hence also the road surface side load attributable duty value D(L) is all the more small, exemplarily even in the case the steering torque Ts is equal to the predetermined value Tb corresponding to such a state that Ts has just exceeded the dead zone $D_2$ as shown in FIG. 8, the provisional duty value D(Ts) of the control signal $T_4$ leads to the value $k_1$ corresponding to a frictional load attributed component, as shown in FIG. 10. Accordingly, even in the case a manipulation of the steering wheel from the neutral position to left or right is started at a low speed with a relatively small force, the electric motor 14 is adapted to produce such auxiliary torque that corresponds to the steering load due to the friction elements of the servo device 1. Therefore, in the positive steering state, when starting turning the steering wheel, it is permitted to achieve a smooth steering feeling free of frictional feeling.

On the other hand, in the steering wheel returning state of the system 50, the armature voltage Va to be impressed to the electric motor 14 is determined in dependence on the control signal $T_4$ which depends on the characteristic curve $L_2$ obtained by subtracting the frictional load attributable duty value D(F) from the road surface side load attributable duty value D(L). Accordingly, it is not needed to have the electric motor 14 rotated from the steered wheel side through the reduction gear 15. Thus, it does not so occur that the returning characteristic of the steering wheel receives effects of the friction elements, particularly of frictional components of the electric motor 14. Therefore, even in the steering wheel returning state, it is permitted to provide the steering wheel with a favorable returning characteristic free of frictional feeling.

As described, according to the present invention, the magnitude of an armature voltage Va is always determined, 10 taking into consideration the steering load due to friction elements of a servo device 1 in addition to the road surface side load as well as steering speed Ns. Accordingly, there is provided an electric power steering system 50 for vehicles which permits in the positive steering state thereof a steering wheel to be operated without frictional feeling even in the case a manipulation of the steering wheel from its neutral position to the left or right is started at a low speed with a relatively small steering force and, besides, in the steering wheel returning state thereof a favorable returning characteristic of the steering wheel to be achieved without frictional feeling, so that it is allowed to achieve a smooth and favorable steering feeling comparable with the case of a manual steering system.

Moreover, in the embodiment above, though employing the control circuit 16 including the MCU 30 as a control device of the entirety of the steering system 50, the duty values D(K·Nm), D(Ts), D'(Ts) for determining the control signal $T_4$ are determined from the signals $S_1$, $S_2$, $S_3$, $S_4$, fundamentally in an address designation manner, whereby the electric motor 14 is permitted to be so controlled as to sufficiently quickly follow up the steering speed Ns.

Incidentally, in the control circuit 16, instead of the MCU 30 there may be employed such a circuitry that has comparable functions.

Figure 13:
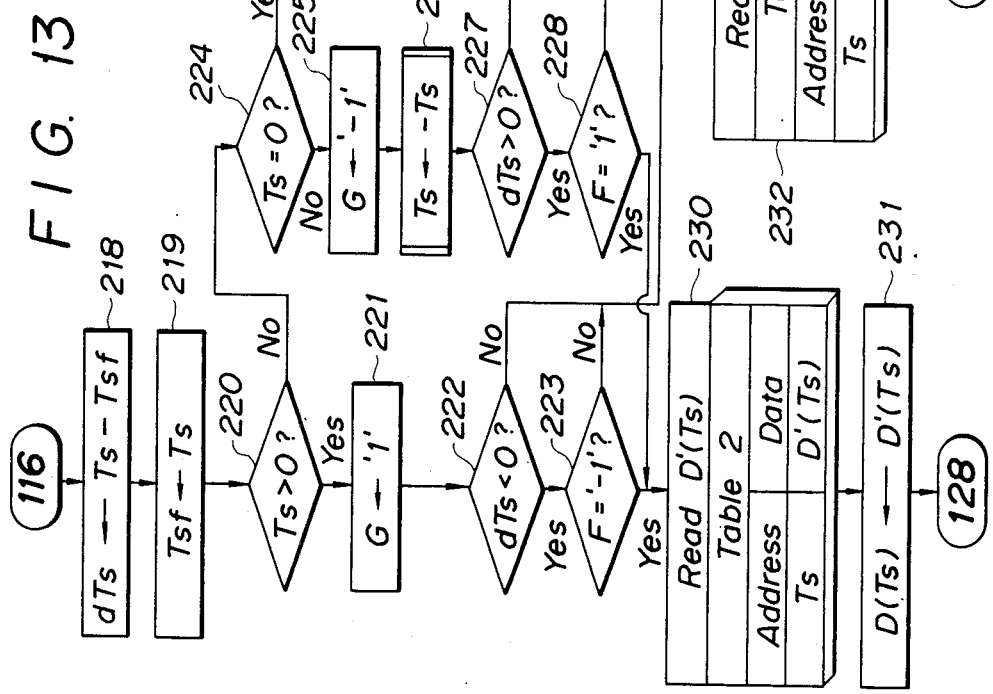
FIG. 13 is a partial flowchart showing a modified example of control processes to be executed by the microcomputer unit.

In FIG. 13, there is shown a modified example of the control processes at the MCU 30.

In the modified example, those process stages 218 to 232 thereof shown in FIG. 13 are employed instead of the stages 117 to 127 of FIGS. 4A and 4B. Other processes of the modified example are similar to those in FIGS. 4A, 4B and their representation and description are omitted. Like parts and parameters are designated by like reference numbers.

At stage 218, there is made a subtraction such that Ts−Tsf, where Ts is algebraically represented steering torque in the current program cycle and Tsf is that of the last cycle, and the result thereof is stored as a steering torque variation dTs. Incidentally, the steering torque variation dTs is set to zero when the circuit 16 is initialized with power applied.

Next, at stage 219, the steering torque Ts as it is then given is stored as the last-cycle steering torque Tsf for use in the next cycle. Thereafter, the flow goes to decision stage 220.

At the decision stage 220, to discriminate the acting direction of the steering torque, there is made a judgment whether or not the value of Ts is positive. And, if the acting direction of the steering torque is clockwise, that is, in the case the value of Ts is positive, the flow goes through stage 221, where a second flag G is set such that G='1', to decision stage 222. At the decision stage 222, it is judged whether or not the steering torque variation dTs is negative. Then, in the case dTs is negative, the flow goes to decision stage 223. At the decision stage 223, to discriminate the rotating direction of the steering wheel, a judgment is made as to whether or not the value of a first flag F, as it is then given, is '−1' or not; and in the case F='−1', the flow goes to stage 230.

If at the stage 222 the steering torque variation dTs is judged not to be negative, or if at the stage 223 the first flag F is not so judged that F='−1', the flow goes to stage 232.

On the other hand, if at the decision stage 220 the steering torque Ts is judged not to be positive, the flow goes to decision stage 224. At the stage 224, there is made a judgment whether Ts is zero or not. Then, in the case Ts is zero, the flow goes to stage 229, where the second flag G is set such that G='0', and thereafter to the stage 232.

If at the stage 224 the steering torque Ts is judged not to be zero, that is, in the case the acting direction of the steering torque is counterclockwise, the flow goes to stage 225. At the stage 225, the second flag G is set so that G='−1'. Then, through the next stage 226, where a conversion process is executed to make the steering torque an absolute value such that Ts=−Ts, the flow goes to decision stage 227.

At the decision stage 227, there is made a judgment whether or not the steering torque variation dTs is positive. And, in the case dTs is positive, the flow goes to decision stage 228. At this stage 228, to discrimate the rotating direction of the steering wheel, there is made a judgment about the value of the first flag F as it is then given. Then, in the case F='1', the flow goes to the stage 230.

If at the stage 227 the steering torque variation dTs is judged not to be positive, or if at the stage 228 the first flag F is not so judged that F='1', then the flow goes to the stage 232.

Incidentally, as in the original embodiment, the content of the first flag F corresponds to an algebraic representation of the rotating direction of the steering wheel, that is, the sign of an algebraically represented steering speed Ns; and that of the second flag G to an algebraic representation of the acting direction of the steering torque, that is, the sign of the steering torque Ts.

At the stage 230, in dependence on the absolute value of the steering torque Ts, a second provisional duty value D'(Ts) for the armature voltage control signal T4 is directly read from a table 2 in an unshown ROM, in an address designation manner. The table 2 is same as that used at the stage 126 of FIG. 4B, and detailed description thereof is omitted. After the stage 230, the flow goes to stage 231, where the second provisional duty value D'(Ts) is stored as a provisional duty value D(Ts).

On the other hand, at the stage 232, in dependence on the absolute value of the steering torque Ts, a first provisional duty value D(Ts) for the armature voltage control signal T4 is directly read from a table 1 in the ROM, in an address designation manner. The table 1 is same as that used at the stage 125 of FIG. 4B, and detailed description thereof is omitted.

In the modified example above, it is in the case the flow goes, after the stage 220, by way of the stages 221, 222, 223, or in the case by way of the stages 224, 225, 226, 227, 228, that the flow leads to the stage 230.

In this respect, in the former case, such conditions are met that the steering torque is acting clockwise (or the steering torque Ts is larger than zero), the steering torque is varied in a decreasing direction (or the steering torque variation dTs is negative), and the steering wheel is rotating counterclockwise (or the first flag F is set such that F='−1').

In the latter case, to the contrary, such conditions are met that the steering torque is acting counterclockwise (or the steering torque Ts is smaller than zero), the steering torque is varied in an increasing direction (or the steering torque variation dTs is positive), and the steering wheel is rotating clockwise (or the first flag F is set such that F='1').

In each of the foregoing cases, such a condition is met that the steering torque variation dTs has a sign coincident with the value of the first flag F, under the condition that the value of the first flag F which represents the rotating direction of the steering wheel and that of the second flag G which represents the acting direction of the steering torque are not coincident with each other.

In other words, the flow leads through the stages 220, 221, 222, and 223 to the stage 230 in such a phase of steering that the steering wheel as once manipulated clockwise from the neutral position is caused to return to the neutral position. To the contrary, in the case the steering wheel has been manipulated counterclockwise from the neutral position, the flow goes through the stages 220, 224, 225, 226, 227, and 228 to the stage 230 while the steering wheel is put in its returning state to the neutral position.

Therefore, according to the modified example above, in the steering wheel returning state of the steering system, the determinaion of associated control parameters is rendered more firm.

Figure 14:
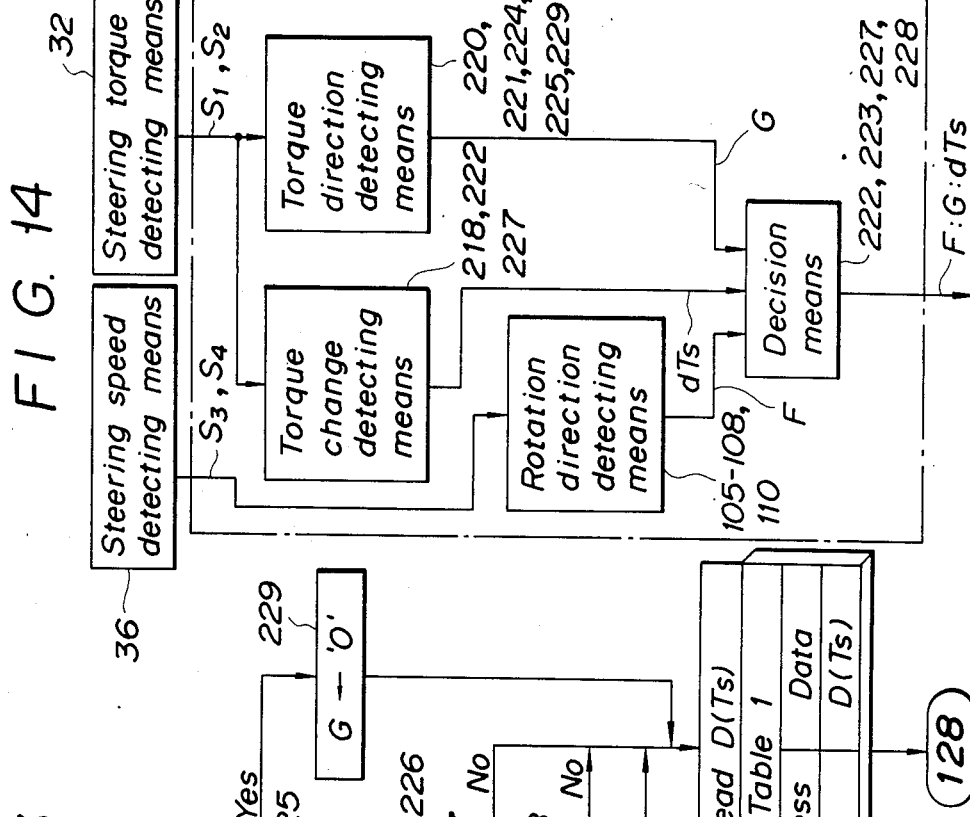
FIG. 14 is a schematic functional block diagram of the control circuit as partially modified as shown in FIG. 13.

Incidentally, FIG. 14 is a diagram in which principal functions of an essential part of the control circuit 16 according to the modification above are schematically represented by use of blocks, while showing relations between some essential elements of the circuit 16 and associated process stages in the flowchart of FIG. 13.

Although there has been described what is at present considered to be the preferred embodiment of the invention, it will be understood that the present invention may be embodied in other specific forms without departing from the spirits or essential characteristics thereof. The present embodiment is therefore to be considered in all respects as illustrative and not restrictive. The scope of the invention is indicated by the appended claims rather than by the foregoing description.

I claim:

1. An electric power steering system (50) for vehicles having an electromagnetic servo device (1) including an input shaft (5) operatively connected to a steering wheel, an output shaft (6) operatively connected to a steered wheel, an electric motor (14) for operatively supplying auxiliary torque to said output shaft (6), steering torque detecting means (32) for detecting steering torque (Ts) acting on said input shaft (5), steering speed detecting means (36) for detecting a steering speed (Ns) of said steering wheel, and drive control means (30, 40) which receives an output signal ($S_1$, $S_2$) from said steering torque detecting means (32) and an output signal ($S_3$, $S_4$) from said steering speed detecting means (36) and feeds said electric motor (14) with a motor drive signal (Va) in accordance with said output signals ($S_1$, $S_2$, $S_3$, $S_4$), wherein:

said drive control means (30, 40) comprises:

first determining means (125; 232) for determining a first provisional component (D(Ts)) of said motor drive signal (Va) in dependence on said output signal ($S_1$, $S_2$) from said steering torque detecting means (32), said first provisional component (D(Ts)) being preset for the positive steering state of said steering system (50);

second determining means (126; 230) for determining a second provisional component (D'(Ts)) of said motor drive signal (Va) in dependence on said output signal ($S_1$, $S_2$) from said steering torque detecting means (32), said second provisional component (D'(Ts)) being preset for the steering wheel returning state of said steering system (50);

third determining means (111) for determining a component (D(K·Nm)) of said motor drive signal (Va) that corresponds to said steering speed (Ns) of said steering wheel, depending on said output signal ($S_3$, $S_4$) from said steering speed detecting means (36);

steering wheel returning state detecting means (119, 124; 222, 223, 227, 228) for judging in which of the positive steering state and the steering wheel returning state said steering system (50) is put, said steering wheel returning state detecting means (119, 124; 222, 223, 227, 228) selecting from between said first provisional component (D(Ts)) and said second provisional component (D'(Ts)) that one which corresponds to the result of the judgment; and means (130, 140) for adding thus selected one of said provisional components (D(Ts)/D'(Ts)) to said steering speed component (D(K·Nm)) to thereby determine the magnitude of said motor drive signal (Va) and outputting said motor drive signal (Va) to said electric motor (14).

2. An electric power steering system for vehicles according to claim 1, wherein:

said steering wheel returning state detecting means (119, 124; 222, 223, 227, 228) is adapted to judge in which of the positive steering state and the steering wheel returning state said steering system (50) is put, in accordance with said output signals ($S_1$, $S_2$, $S_3$, $S_4$) from said steering torque detecting means (32) and said steering speed detecting means (36).

3. An electric power steering system for vehicles according to claim 2, wherein:

said steering wheel returning state detecting means (119, 124) comprises:

means (117 to 123) for determining an acting direction (G) of said steering torque (Ts) in dependence on said output signal ($S_1$, $S_2$) from said steering torque detecting means (32);

means (105 to 110) for determining a rotating direction (F) of said steering wheel in dependence on said output signal ($S_3$, $S_4$) from said steering speed detecting means (36); and comparing means (124) for comparing said acting direction (G) of said steering torque (Ts) and said rotating direction (F) of said steering wheel and judging, only when said acting direction (G) and said rotating direction (F) are not coincident with each other, that said steering system (50) is put in the steering wheel returning state.

4. An electric power steering system for vehicles according to claim 2, wherein:

said steering wheel returning state detecting means (222, 223, 227, 228) comprises:

means (220, 221, 224 to 226, 229) for determining an acting direction (G) of said steering torque (Ts) in dependence on said output signal ($S_1$, $S_2$) from said steering torque detecting means (32);

means (218, 219) for determining a direction of a variation (dTs) of said steering torque (Ts) in dependence on said output signal ($S_1$, $S_2$) from said steering torque detecting means (32);

means (105 to 110) for determining a rotating direction (F) of said steering wheel in dependence on said output signal ($S_3$, $S_4$) from said steering speed detecting means (36); and means (220 to 229) for judging, only when said acting direction (G) of said steering torque (Ts) and said rotating direction (F) of said steering wheel are not coincident with each other and said steering wheel rotating direction (F) and said direction of said steering torque variation (dTs) are coincident with each other, that said steering system (50) is put in the steering wheel returning state.

5. An electric power steering system for vehicles according to claim 1, wherein:

said first provisional component (D(Ts)) determined by said first determining means (125; 232) is given as the sum of a component (D(L)) of said motor drive signal (Va) that corresponds to a road surface side load and a component (D(F)) of said motor drive signal (Va) that corresponds to a load due to friction elements of said electromagnetic servo device (1); and said second provisional component (D'(Ts)) determined by said second determining means (126; 230) is obtained by subtracting said frictional load component (D(F)) from said road surface side load component (D(L)) of said motor drive signal (Va).

6. An electric power steering system for vehicles according to claim 5, wherein:

said frictional load component (D(F)) is preset so as to have a constant value ($k_1$) when said steering torque (Ts) is larger in magnitude than a predetermined value (Tb); and said constant value ($k_1$) is as large as required for said electric motor (14) to produce corresponding torque to said load due to said friction elements of said electromagnetic servo device (1).

7. An electric power steering system for vehicles according to claim 1, wherein:

said drive control means (30, 40) comprises:

a microcomputer unit (30) which receives said output signal ($S_1$, $S_2$) from said steering torque detecting means (32) and said output signal ($S_3$, $S_4$) from said steering speed detecting means (36) and determines to output a motor control signal ($T_2$, $T_3$, $T_4$) representing the content of said motor drive signal (Va) to be fed to said electric motor (14); and motor drive means (40) which receives said motor control signal (T$_2$, T$_3$, T$_4$) and outputs said motor drive signal (Va) to said electric motor (14) in accordance with said motor control signal (T$_2$, T$_3$, T$_4$);

said first, second, and third determining means determining said first provisional component (D(Ts)), said second provisional component (D'(Ts)), and said steering speed component (D(K·Nm)), respectively, comprise a program (100 to 138) for said microcomputer unit (30); and said microcomputer unit (30) determines said first provisional component (D(Ts)), said second provisional component (D'(Ts)), and said steering speed component (D(K·Nm)) in an address designation manner in dependence on said output signal (S$_1$, S$_2$) from said steering torque detecting means (32) and said output signal (S$_3$, S$_4$) from said steering speed detecting means (36), in accordance with said program (100 to 138).

* * * * *